Patented Feb. 2, 1937

2,069,425

UNITED STATES PATENT OFFICE 2,069,425

MANUFACTURE OF LAMINATED GLASS

Charles S. Shoemaker, Jeannette, Pa., assignor to American Window Glass Company, Pittsburgh, Pa., a corporation of Pennsylvania No Drawing. Application June 8, 1936, Serial No. 84,227

8 Claims. (Cl. 49—81)

The present invention relates to the manufacture of laminated glass, and more particularly to an improved method of effecting the union between the component parts of the sandwich, which consists of two or more layers of glass with a layer of a strengthening material disposed between the glass sheets.

Laminated glass has heretofore been manufactured by various different processes. Until relatively recently practically all of the commercial laminated glass was manufactured by the inter-positioning of a pre-formed sheet of cellulose nitrate or cellulose acetate between two glass sheets and uniting the two glass sheets to the pre-formed sheet of strengthening material by means of an adhesive and by the use of heat and pressure to effect the union between the sheet of strengthening material and the two glass sheets. This method of forming the laminated sheet has been practiced in various different ways. For instance, originally it was proposed to coat the glass sheets with a layer of gelatin and to place the pre-formed sheet of cellulose nitrate or cellulose acetate between the coated sheets and to then place the sandwich between heated platens and to subject the sandwich to pressure in the presence of heat. Subsequently, it was proposed to place the formed sandwiches in individual rubber bags and to exhaust the air therefrom, and to then place the rubber bags in an autoclave and to circulate heated liquid under pressure around the rubber bags containing the laminated product. By thus subjecting the sandwiches to heat and pressure a sufficiently intimate contact between the glass sheets and the layer of strengthening material was effected.

Some difficulty was encountered in this latter process and subsequently it was proposed to also subject the glass sheets to a further treatment by removing them from the rubber bags and placing them in an autoclave and subjecting them further to the action of a heated liquid under pressure.

Subsequently the rubber bag method of contacting the sheets was dispensed with and the sandwiches were formed by effecting a preliminary contacting with a press or by means of rolls between which the sandwiches were passed and to then place the sandwiches in an autoclave and to subject them to the direct action of a heated liquid placed under a substantial pressure.

In all of the above methods the union between the glass sheets and the layer of strengthening material was effected by both heat and pressure. In the autoclave method the temperature of the liquid circulated around the glass sheets was in the neighborhood of from 200 to 250° F., and the pressures employed ranged from approximately 125 pounds per square inch to 200 pounds per square inch. It will be understood, of course, that the pressures and temperatures could be and were varied to some extent, but in all cases relatively high temperatures and pressures were employed.

Various different pre-formed sheets of strengthening material have heretofore been utilized in the manufacture of laminated glass, and in all cases it has been heretofore deemed essential to utilize both heat and pressure in effecting the union between the component parts of the sandwich, and the sandwich has in all cases been subjected to both the heat and pressure simultaneously.

It has also been proposed heretofore to employ what might be termed a "liquid process." In such process the strengthening material in liquid form is flowed on the glass sheets and the films permitted to dry thereon, and then two such coated sheets united together with their coated faces juxtaposed. The union between the component parts has been effected by subjecting the two coated sheets to heat and pressure. In some cases this has been accomplished by placing the sheets between the heated platens of a press and subjecting them to pressure in the presence of heat. In other cases the union has been effected by preliminarily contacting the coated glass sheets by passing them between rolls and then placing the preliminarily contacted sheets in an autoclave and subjecting them to the action of a heated fluid in the presence of pressure. In other words, the process of effecting the union in the case of the liquid process has heretofore been somewhat similar to that employed where a pre-formed sheet of the strengthening material has been utilized, except that where a pre-formed sheet of strengthening material has been employed the preliminary contacting has been of such character as to rigidly secure the component parts of the sandwich together whereas in the liquid process the preliminary contacting has merely served to squeeze out excess liquid used to prevent air from becoming entrapped between the sheets.

By my invention I provide an improved method of effecting the union between the component parts of the sandwich. I have found that my improved process not only results in a product which is equally as good or better than the products made in accordance with the above methods, but it also results in the elimination of a substantial amount of breakage and in the savings of a considerable amount of time, all of which results in substantially decreasing manufacturing costs.

By my invention I provide a method or process of effecting the union between the component parts of the sandwich without the employment of heat and pressure. In accordance with my invention, I propose to effect this union by subjecting the preliminarily contacted sandwich to pressure alone, as I have found that the employment of heat or the employment of heat and pressure as heretofore practiced is unnecessary and a product which is entirely satisfactory can be obtained by the use of pressure alone.

In order to enable a complete understanding of my invention, I shall describe it as applied to the so-called liquid process of manufacturing laminated glass. It will be understood, however, that my invention is not in any way limited to the liquid process but may be employed where the strengthening material is in the form of a preformed sheet and is interposed between the glass sheets.

In carying out my invention the glass sheets are cleaned so as to remove all foreign matter from the surface thereof. Then each glass sheet is coated with a relatively thin film of the strengthening material, the strengthening material being flowed in liquid form onto the glass sheets. While the strengthening material may be flowed on the glass sheets in any suitable manner, I prefer to place the glass sheets on a horizontal conveyor and to thereby carry the sheets past a flow machine which is provided with an orifice through which the strengthening material is flowed, the orifice being of sufficient width to provide an appropriate film on the glass sheets.

While it will be understood that my invention is not in any way confined to the particular strengthening material which is employed, I shall hereinafter refer to the strengthening material as a polymerized acrylic acid ester in view of the fact that this is one of the materials which is being used extensively commercially.

After the sheets have been coated, they are carried by means of a conveyor through a drying unit which is provided with heating elements and arranged to permit the circulation of heated air around the coated glass sheets so as to dry the films. It will be understood, of course, that the heating elements may be so located as to supply a substantial portion of the heat for drying the film by radiation.

After the films have become sufficiently dry the coated sheets are removed from the discharge end of the conveyor-heater. At this time the sheets of glass are at an elevated temperature. The coatings or films of the two sheets are then sprayed with a suitable contacting liquid. Where a polymerized acrylic acid ester is employed as the strengthening material a suitable contacting liquid is dibutyl phthalate. The coated sheets are practically flooded with the contacting liquid so as to prevent the possibility of any air becoming entrapped between the coated sheets when they are placed together.

Thereafter the coated sheets are placed together with the coatings juxtaposed to form the sandwich. A preliminary contacting is effected by passing the sandwich between rolls which apply a small pressure to the sandwich. After this preliminary contacting is effected, the sandwich may be immediately placed in the autoclave or it may be permitted to cool down to substantially room temperature. It will be understood that in a continuous process the sandwich has not lost all of its heat obtained during the drying operation by the time the preliminary contacting has been effected. The temperature of the sandwich, however, is not particularly high at this time and I have found that satisfactory results can be obtained if the sandwich is immediately placed in the autoclave for pressure treatment and that also satisfactory results can be obtained where the sandwich is permitted to cool somewhat between the preliminary contacting operation and the pressure autoclaving thereof.

In accordance with my invention I take the preliminarily contacted sandwich and place it in an enclosed chamber or, as it is frequently termed, an autoclave, either alone or with a plurality of such sandwiches, and subject it or them to pressure only. In accordance with my invention no heat is supplied to the autoclave, the sandwiches being subjected merely to fluid pressure. I have found that satisfactory results can be obtained by the employment of pressures ranging from 20 pounds per square inch up. In ordinary practice I find that a pressure of 50 pounds per square inch applied for a period of 45 minutes gives entirely satisfactory results.

I have found that highly desirable results are obtained and any possibility of bubbles remaining or forming in the finished product obviated where the sandwiches are actually cooled while in the autoclave, the cooling being effected under pressure. For instance, the sandwiches may be slightly above room temperature, say between 120 and 150° F., at the time they are placed in the autoclave. While in the autoclave the temperature of the air surrounding the sandwiches is below the temperature of the sandwiches and the sandwiches are cooled under pressure. While I am not certain as to exactly what movement of the strengthening material takes place, I am of the present view that in all probability there is an equalization of minute strains which may be present in the strengthening material brought about by the cooling under pressure or by merely permitting the sandwiches to remain under pressure for a period of time.

As stated above, satisfactory results are obtained where the preliminarily contacted sandwiches are permitted to cool to substantially room temperature before being placed under pressure. In such cases also I believe that the subjecting of the glass sheets to pressure brings about an equalization of the strains which may be present in the strengthening material.

It will be understood, of course, that where it is desired to have some cooling of the sandwiches under pressure, it is not necessary that the sandwiches be substantially above room temperature when they are placed in the autoclave as refrigerating apparatus may be embodied in the autoclave for causing the cooling of the sandwiches under pressure.

When the sheets are taken from the autoclave they are cooled and can be readily handled by the workmen and they can be immediately cleaned and made ready for shipment. In the old practices employed prior to my invention, the laminated sheets were at an elevated temperature when taken from the autoclave and it was necessary to permit them to cool for a relatively long period of time, say in the neighborhood of 4 to 8 hours, before they could be appropriately cleaned and otherwise prepared for shipment. In this respect my invention is of considerable advantage over the presently employed practices as this time factor is of considerable importance.

By virtue of the fact that the laminated sheets are cool when taken from the autoclave, considerable breakage is eliminated. In the old practices, the laminated sheets were hot when taken from the autoclave and considerable breakage was encountered during the cooling and handling thereof. In my process the sheets are cooled and can be immediately handled and further processed without fear of breakage.

While I have described a preferred method of practicing my invention, it should be understood that it is not in any way limited to the so-called liquid process. Nor is it limited to the use of any particular flexible strengthening material. My invention may be practiced otherwise than hereinbefore described within the scope of the appended claims.

I claim:

1. In the manufacture of laminated glass the steps consisting in forming a film of a solution of a polymerized acrylic acid ester on a glass sheet, thereafter drying the film on the glass sheet by heat, forming a film of dibutyl phthalate on the coating on the glass sheet, forming a sandwich of the coated glass sheet and a second similarly coated glass sheet with the strengthening material therebetween and thereafter, without the application of heat, subjecting the sandwich to pressure and permitting it to cool down under pressure.

2. In the manufacture of laminated glass, the steps consisting in forming a film of a solution of a polymerized acrylic acid ester on one surface of each of two glass sheets, thereafter drying the films on the glass sheets by heat, forming a film of dibutyl-phthalate on at least one of the films on the glass sheets, forming a sandwich of the coated glass sheets with the films of strengthening material juxtaposed, and thereafter, without the application of heat, subjecting the sandwich to fluid under pressure, the temperature of the fluid being below that of the composite product, whereby the sandwich is permitted to cool under pressure.

3. In the manufacture of laminated glass, the steps consisting in forming a film of a solution of a polymerized acrylic acid ester on one surface of each of two glass sheets, thereafter drying the films on the glass sheets by heat, forming a film of dibutyl phthalate on at least one of the films on the glass sheets, forming a sandwich of the coated glass sheets with the films of strengthening material juxtaposed, thereafter passing the sandwich between rolls to squeeze out any excess contacting liquid, and thereafter subjecting the sandwich to a cooling gas under pressure, whereby the sandwich is permitted to cool under pressure.

4. In a continuous process of manufacturing laminated glass, the steps consisting in forming a film of a solution of a polymerized acrylic acid ester on one face of each of two glass sheets, thereafter drying the films by heat, immediately thereafter forming a film of dibutyl phthalate on at least one of the dried coatings on the glass sheets, immediately thereafter forming a sandwich of the two coated glass sheets with the films juxtaposed, and immediately thereafter, without the application of heat, subjecting the sandwich to a cooling fluid under pressure, the coated glass sheets being continuously cooled after drying the films of strengthening material thereon.

5. In the manufacture of laminated glass, the steps consisting in forming a film of a solution of a polymerized acrylic acid ester on a glass sheet, thereafter drying the film on the glass sheet by the application of heat, forming a film of a contacting liquid on the film on the glass sheet, forming a sandwich of the coated glass sheet and a similarly coated glass sheet with the films juxtaposed, immediately thereafter subjecting the sandwich to sufficient pressure to squeeze out any excess contacting liquid, and thereafter, while the sandwich still retains residual heat from the drying operation, subjecting the sandwich to a cooling fluid under pressure without the application of heat, whereby the sandwich is permitted to cool down under pressure.

6. In the manufacture of laminated glass, the steps consisting in forming a film of a solution of a polymerized acrylic acid ester on a glass sheet, thereafter drying the film on the glass sheet by heat, forming a film of a contacting liquid on the film on the glass sheet, forming a sandwich of the coated glass sheet and a similarly coated glass sheet with the films juxtaposed and thereafter, without the application of heat, subjecting the sandwich to gaseous pressure.

7. In the manufacture of laminated glass, the steps consisting in forming a film of a solution of a polymerized acrylic acid ester on one face of each of two glass sheets, thereafter drying the films by heat, immediately thereafter forming a film of a contacting liquid on at least one of the dried coatings on the glass sheets, immediately thereafter forming a sandwich of the two coated glass sheets with the films juxtaposed, and immediately thereafter, without the application of heat, subjecting the sandwich to a cooling gas under pressure, the coated glass sheets being continuously cooled after completion of the drying operation.

8. In a continuous process for the manufacture of laminated glass, the steps consisting in forming a film of a solution of a polymerized acrylic acid ester on one face of each of two glass sheets, thereafter drying the films by the application of heat, thereafter, while the coatings still retain heat from the drying operation, forming a film of a contacting liquid on at least one of the films of strengthening material, thereafter forming a sandwich of said glass sheets with the strengthening material therebetween and thereafter, without the application of heat, subjecting the sandwich to a cooling fluid under pressure, the coated glass sheets being continuously cooled after drying the film of strengthening material.

CHARLES S. SHOEMAKER.